(12) United States Patent
Kwon

(10) Patent No.: US 9,437,217 B2
(45) Date of Patent: Sep. 6, 2016

(54) PRE-PROCESSING APPARATUS AND METHOD FOR SPEECH RECOGNITION

(71) Applicant: HYUNDAI MOBIS CO., LTD., Seoul (KR)

(72) Inventor: Min Ho Kwon, Yongin-si (KR)

(73) Assignee: HYUNDAI MOBIS Co., Ltd., Seoul (KR)

(*) Notice: Subject to any disclaimer, the term of this patent is extended or adjusted under 35 U.S.C. 154(b) by 8 days.

(21) Appl. No.: 14/484,084

(22) Filed: Sep. 11, 2014

(65) Prior Publication Data
US 2015/0142430 A1 May 21, 2015

(30) Foreign Application Priority Data
Nov. 15, 2013 (KR) ........................ 10-2013-0139068

(51) Int. Cl.
G10L 15/00 (2013.01)
G10L 25/78 (2013.01)
G10L 15/22 (2006.01)
G10L 21/045 (2013.01)

(52) U.S. Cl.
CPC ............... *G10L 25/78* (2013.01); *G10L 15/00* (2013.01); *G10L 15/22* (2013.01); *G10L 21/045* (2013.01)

(58) Field of Classification Search
CPC ... G10L 19/00; G10L 19/012; G10L 19/028; G10L 19/26; G10L 21/00; G10L 21/02; G10L 25/00; G10L 25/78; G10L 2025/00; G10L 2025/78; G10L 2025/783; G10L 2025/93; G10L 2025/932; G10L 15/00; G10L 15/04; G10L 15/05; G10L 15/08; G10L 15/20; G10L 15/22; G10L 15/26
USPC ................ 704/231, 210, 215, 233, 234, 253
See application file for complete search history.

(56) References Cited

U.S. PATENT DOCUMENTS

| 2002/0049592 A1* | 4/2002 | Kobayashi | G10L 25/78 704/246 |
| 2007/0019931 A1* | 1/2007 | Sirbu | H04N 5/04 386/207 |
| 2011/0106283 A1* | 5/2011 | Robinson | G06Q 20/123 700/94 |
| 2014/0324419 A1* | 10/2014 | Beerends | G10L 25/69 704/225 |

FOREIGN PATENT DOCUMENTS

KR 10-0714721 B1 5/2007

* cited by examiner

Primary Examiner — Qi Han
(74) Attorney, Agent, or Firm — Knobbe Martens Olson & Bear LLP

(57) ABSTRACT

A pre-processing apparatus for speech recognition may include: a trailing silence period detection unit configured to detect the length of a trailing silence period contained in a speech signal; a reference trailing silence period storage unit configured to store the length of a reference trailing silence period; and a trailing silence period adjusting unit configured to adjust the length of the trailing silence period contained in the speech signal based on the length of the reference trailing silence period.

6 Claims, 5 Drawing Sheets

FIG. 1
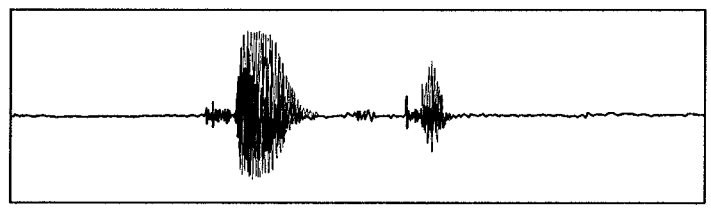
(a) WHEN TRAILING SILENCE PERIOD IS PROPER
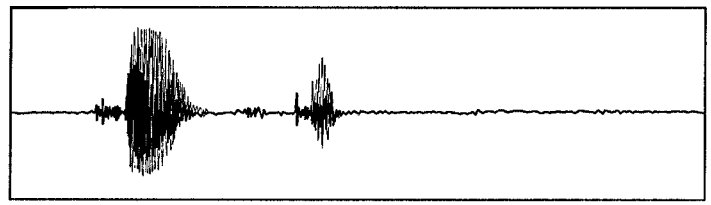
(b) WHEN TRAILING SILENCE PERIOD IS SHORT
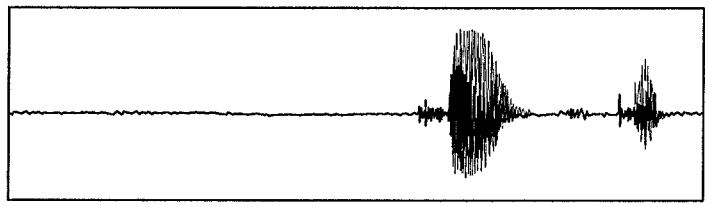
(c) WHEN TRAILING SILENCE PERIOD IS LONG

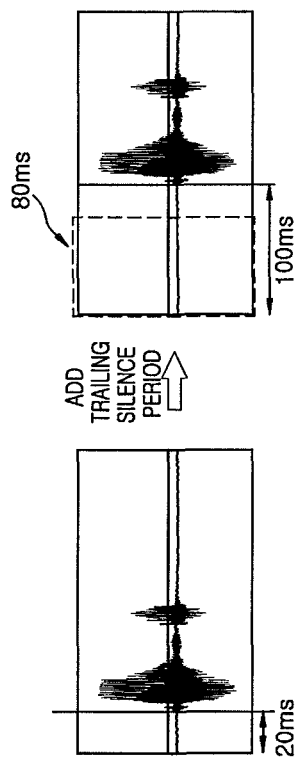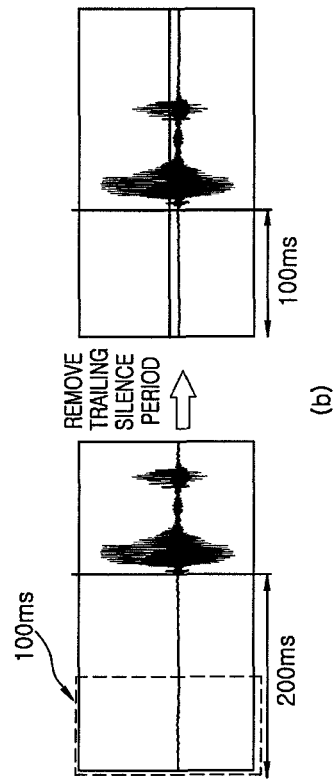

FIG. 5

|  | TRAILING SILENCE PERIOD (TIME) | AFTER ADJUSTING TRAILING SILENCE PERIOD (TIME) | SPEECH RECOGNITION RATE |
|---|---|---|---|
| BEFORE ADJUSTING | 20ms |  | 90% |
|  | 100ms |  | 95% |
|  | 200ms |  | 90% |
| AFTER ADJUSTING | 20ms | 100ms | 95% |
|  | 100ms | 100ms | 95% |
|  | 200ms | 100ms | 95% |

PRE-PROCESSING APPARATUS AND METHOD FOR SPEECH RECOGNITION

CROSS-REFERENCES TO RELATED APPLICATIONS

The present application claims priority to Korean application number 10-2013-0139068, filed on Nov. 15, 2013, which is incorporated by reference in its entirety.

BACKGROUND

The present disclosure relates to a pre-processing apparatus and method for speech recognition, and more particularly, to a pre-processing apparatus and method for speech recognition, which is capable of pre-processing a speech signal by adjusting a trailing silence period in consideration of a user's tendency during speech recognition, thereby improving a speech recognition function.

Recently, with the development of intelligent electronic devices, a lot of attempts have been made to control a device through a speech.

In order to control a device through a speech, the device needs to distinguish the speech and understand words. Thus, research has been actively conducted on a speech recognition sensor or speech recognition device.

Recently, a revised bill of the road traffic act has been proposed to prohibit DMB watching or navigation searching. Thus, much attention has been paid to a speech recognition function of a navigation system.

For the speech recognition function, however, a large amount of resources may be consumed in a device (for example, a CPU or memory). Thus, in a portable device such as a navigation system, which includes a relatively small amount of resources, resource consumption needs to be minimized. Furthermore, in order to reliably perform signal processing, a period at which a speech is inputted needs to be detected as accurately as possible.

The related art is disclosed in Korean Patent No. 10-0714721 published on Apr. 27, 2007, and entitled "Method and apparatus for detecting speech period".

SUMMARY

Embodiments of the present invention are directed to a pre-processing apparatus and method for speech recognition, which is capable of adjusting a trailing silence period by pre-processing a speech signal in consideration of a user's tendency during speech recognition, thereby improving a speech recognition function.

In one embodiment, a pre-processing apparatus for speech recognition may include: a trailing silence period detection unit configured to detect the length of a trailing silence period contained in a speech signal; a reference trailing silence period storage unit configured to store the length of a reference trailing silence period; and a trailing silence period adjusting unit configured to adjust the length of the trailing silence period contained in the speech signal based on the length of the reference trailing silence period.

The trailing silence period may include a silence period required until an actual user's speech in the speech signal inputted through a speech input unit is inputted after a speech recognition start sound is outputted.

The trailing silence period adjusting unit may increase the length of the trailing silence period of the speech signal to the length of the reference trailing silence period, when the length of the trailing silence period detected in the speech signal is smaller than the length of the reference trailing silence period.

The trailing silence period adjusting unit may decrease the length of the trailing silence period of the speech signal to the length of the reference trailing silence period, when the length of the trailing silence period detected in the speech signal is larger than the length of the reference trailing silence period.

The trailing silence period adjusting unit may add or remove a period corresponding to the initial part of the speech signal, when the trailing silence period is adjusted.

In another embodiment, a pre-processing method for speech recognition may include: receiving a speech signal; detecting the length of a trailing silence period contained in the speech signal; and adjusting the length of the trailing silence period contained in the speech signal based on the length of a preset reference trailing silence period.

The adjusting of the length of the trailing silence period may include increasing the length of the trailing silence period of the speech signal to the length of the reference trailing silence period, when the length of the trailing silence period detected in the speech signal is smaller than the length of the reference trailing silence period.

The adjusting of the length of the trailing silence period may include decreasing the length of the trailing silence period of the speech signal to the length of the reference trailing silence period, when the length of the trailing silence period detected in the speech signal is larger than the length of the reference trailing silence period.

The adjusting of the length of the trailing silence period may include adding or removing a period corresponding to the initial part of the speech signal, when the trailing silence period is adjusted.

The trailing silence period may include a silence period required until an actual user's speech in the speech signal inputted through a speech input unit is inputted after a speech recognition start sound is outputted.

In accordance with the embodiment of the present invention, the pre-processing apparatus and method for speech recognition may pre-process a speech signal by adjusting a trailing silence period in consideration of a user's tendency during speech recognition, thereby improving a speech recognition function.

BRIEF DESCRIPTION OF THE DRAWINGS

FIG. 1 is a diagram for explaining a speech recognition rate depending on the length of a trailing silence period contained in an input speech signal in a conventional speech recognition device.

FIGS. 4A and 4B are diagrams illustrating speech signals in order to describe a method for adjusting a trailing silence period in FIG. 3.

FIG. 5 is a table comparatively showing speech recognition rates in the case where the length of a trailing silence period contained in a speech signal is adjusted and the case where the length of the trailing silence period contained in the speech signal is not adjusted.

DESCRIPTION OF SPECIFIC EMBODIMENTS

Hereafter, a pre-processing apparatus and method for speech recognition in accordance with an embodiment of the present invention will be described in detail with reference to the accompanying drawings.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

In a speech recognition device (or speech recognition engine), a method of applying a trailing silence period may be used to accurately detect the speech input period.

The trailing silence period refers to a time period required until a speech signal is actually applied after a start sound (for example, beep sound) is outputted or a silence period between syllables. The start sound instructs a user to start a speech input for speech recognition.

For example, when a user holds down a speech recognition operation button provided on a speech recognition device (for example, navigation system), the speech recognition device outputs a speech recognition start sound (for example, beep sound), in order to normally process a signal during the speech recognition operation. Thus, the user hearing the start sound inputs a speech (or speech command), and the speech recognition device processes the speech signal inputted after the start sound is outputted, and analyzes the speech (or speech command).

Thus, when speech recognition is performed according to the above-described method in which a speech is inputted after a start sound is outputted, the speech may be inputted before the start sound is outputted, as illustrated in FIG. 1B, or the speech may be inputted in a predetermined time after the start sound is outputted, as illustrated in FIG. 1C. In this case, the speech recognition device may neither reliably process the signal, nor accurately recognize the speech. That is, the speech recognition rate may be degraded.

In other words, when speech recognition is performed according to the above-described method in which a speech is inputted after a start sound is outputted, a speech signal containing a trailing silence period with a proper length needs to be inputted depending on the speech recognition device, as illustrated in FIG. 1A. However, when the trailing silence period is increased or decreased according to a user's tendency, the speech recognition rate may be degraded more than in the case where a trailing silence period with a proper length is contained.

Figure 2:
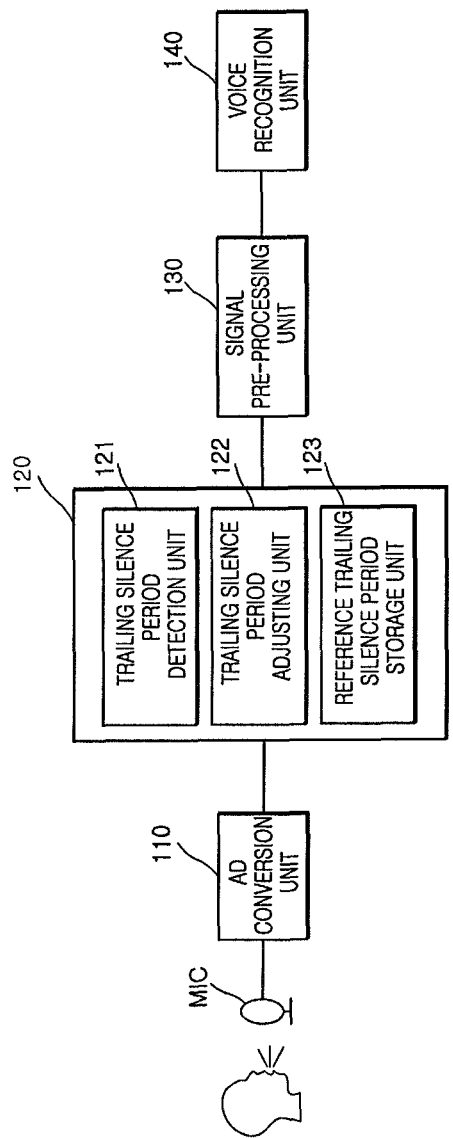
FIG. 2 schematically illustrates the configuration of a speech recognition apparatus in accordance with an embodiment of the present invention.

FIG. 2 schematically illustrates the configuration of a speech recognition apparatus in accordance with an embodiment of the present invention.

As illustrated in FIG. 2, the speech recognition apparatus in accordance with the embodiment of the present invention may include a speech input unit MIC, an analog-to-digital (AD) conversion unit 110, a trailing silence period pre-processing unit 120, a signal pre-processing unit 130, and a speech recognition unit 140.

The speech input unit MIC is a unit for receiving a user's speech, and may include a microphone, for example.

The AD conversion unit 110 may convert the user's speech signal outputted from the voice input unit MIC into a digital signal which can be easily processed.

The trailing silence period pre-processing unit 120 may include a trailing silence period detection unit 121, a reference trailing silence period storage unit 123, and a trailing silence period adjusting unit 122. The trailing silence period detection unit 121 may detect the length of a trailing silence period (time) contained in the speech signal. The reference trailing silence period storage unit 123 may store the length of a preset reference trailing silence period (time). The trailing silence period adjusting unit 122 may adjust the length of the trailing silence period contained in the speech signal according to the length of the reference trailing silence period.

Thus, the trailing silence period pre-processing unit 120 may detect the trailing silence period (time) in the user's speech signal converted into the digital signal, and adjust the length of the trailing silence period contained in the speech signal according to the length of the preset reference trailing silence period.

For example, when the length of the trailing silence period detected in the speech signal is smaller than the length of the reference trailing silence period, the length of the trailing silence period of the speech signal may be increased to the length of the reference trailing silence period. On the other hand, when the length of the trailing silence period detected in the speech signal is larger than the length of the reference trailing silence period, the length of the trailing silence period of the speech signal may be decreased to the length of the reference trailing silence period.

At this time, the trailing silence period pre-processing unit 120 may be implemented with one control unit such as a micro processor or digital signal processor, in order to adjust the trailing silence period in a software manner.

The trailing silence period refers to a time period which is required until a user's speech in the speech signal detected through the speech input unit MIC is actually inputted after the speech recognition start sound (beep sound) is outputted. For convenience of descriptions, suppose that the trailing silence period is 100 ms. At this time, a point at which the user's speech is actually inputted may be set to a point corresponding to a preset threshold level or more in the speech signal.

The signal pre-processing unit 130 may receive the speech signal of which the trailing silence period is pre-processed, and pre-process the received speech signal.

That is, the signal pre-processing unit 130 may perform a signal pre-processing operation required for speech recognition. For example, the signal pre-processing unit 130 may remove noise from the speech signal or perform automatic gain control.

The speech recognition unit 140 may recognize the pre-processed speech signal.

That is, the speech recognition unit 140 may recognize what a command corresponding to the speech signal means. In other words, the speech recognition unit 140 may determine the command corresponding to the speech signal.

In the present embodiment, the detailed descriptions of the signal pre-processing unit 130 and the speech recognition unit 140 which have no direct relation to the technical idea of the present invention will be omitted.

Figure 3:
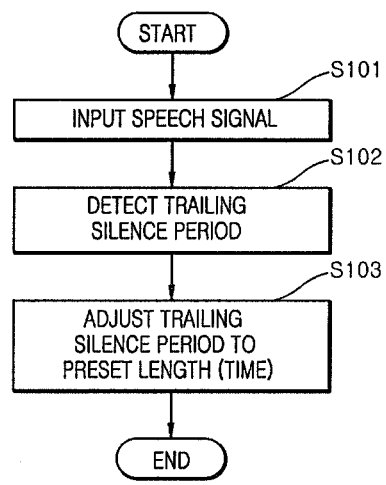
FIG. 3 is a flowchart for explaining a pre-processing method for speech recognition in accordance with an embodiment of the present invention.

FIG. 3 is a flowchart for explaining a pre-processing method for speech recognition in accordance with an embodiment of the present invention. FIGS. 4A and 4B are diagrams illustrating speech signals in order to describe a method for adjusting a trailing silence period in FIG. 3.

Referring to FIGS. 3 and 4, the method for adjusting the length of a trailing silence period contained in a speech signal will be described.

The trailing silence period pre-processing unit 120 may receive a speech signal converted into a digital signal at step S101.

The length of a trailing silence period contained in the speech signal may be detected at step S102.

At this time, the length of the trailing silence period contained in the speech signal may be smaller than the length of the reference trailing silence period (for example, 100 ms) as illustrated in FIG. 4A, or larger than the length of the reference trailing silence period as illustrated in FIG. 4B.

Thus, when the length of the trailing silence period detected from the speech signal (for example, 20 ms) is smaller than the length of the reference trailing silence period as illustrated in FIG. 4A, the trailing silence period pre-processing unit 120 may add a trailing silence period (for example, 80 ms) according to the length of the reference trailing silence period (for example, 100 ms), at step S103.

Similarly, when the length of the trailing silence period detected from the speech signal (for example, 200 ms) is larger than the length of the reference trailing silence period as illustrated in FIG. 4B, the trailing silence period pre-processing unit 120 may remove a part of the trailing silence period (for example, 100 ms) according to the length of the reference trailing silence period (for example, 100 ms), at step S103.

At this time, the adjusted part of the trailing silence period may correspond to the initial part of the speech signal.

As described above, the trailing silence period pre-processing unit 120 may adjust the length of the trailing silence period contained in the speech signal to the length of the reference trailing silence period, thereby improving the speech recognition rate.

FIG. 5 is a table comparatively showing speech recognition rates in the case where the length of a trailing silence period contained in a speech signal is adjusted and the case where the length of the trailing silence period contained in the speech signal is not adjusted.

As shown in FIG. 5, when the length of the trailing silence period contained in the speech signal (for example, 20 ms) is smaller than the length of the reference trailing silence period (for example, 10 ms) or the length of the trailing silence period contained in the speech signal (for example, 200 ms) is larger than the length of the reference trailing silence period, the speech recognition rate is as low as 90%. However, when the length of the trailing silence period contained in the speech signal is adjusted to the length of the reference trailing silence (for example, 100 ms) through the method in accordance with the embodiment of the present invention, the speech recognition rate may be improved to 95%.

Although embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A speech recognition system for a vehicle, the system comprising:
   a speech recognition module configured to analyze voice data for recognition of a voice command, wherein the voice recognition module's voice recognition accuracy varies depending on length of a leading silence contained in the voice data, wherein the leading silence is defined as a period prior to the first signal reaching a predetermined intensity in the voice data;
   a voice capturing module configured to capture a voice command subsequent to a voice command prompt sound generated by the speech recognition system; and
   a voice data module configured to analyze captured data of the voice command and to determine whether to adjust a leading silence in the captured data to have a predetermined length to improve speech recognition accuracy of the speech recognition module.

2. The speech recognition system of claim 1, wherein the voice data module is configured to lengthen the leading silence when the leading silence is shorter than the predetermined length in the captured data.

3. The speech recognition system of claim 2, wherein the voice data module is configured to shorten the leading silence when the leading silence is longer than the predetermined length in the captured data.

4. A speech recognition method for a vehicle, the method comprising:
   generating a voice command prompt sound while the vehicle is running;
   subsequently capturing a voice command to provide a voice data;
   analyzing the voice data and determining whether to adjust a leading silence in the voice data to have a predetermined length for improve speech recognition accuracy of a speech recognition module, wherein the leading silence is defined as a period prior to the first signal reaching a predetermined intensity in the voice data;
   modifying the voice data to include a leading silence of the predetermined length; and
   analyzing modified voice data to recognize of the voice command using the speech recognition module.

5. The method of claim 4, wherein modifying the voice data comprises lengthening the leading silence when the leading silence is shorter than the predetermined length in the voice data.

6. The pre processing method of claim 4, wherein modifying the voice data comprises shortening the leading silence when the leading silence is longer than the predetermined length in the voice data.

* * * * *